(12) United States Patent
Farrell et al.

(10) Patent No.: US 7,719,700 B2
(45) Date of Patent: May 18, 2010

(54) IMAGE FORMING DEVICE WITH PRINT MODE ACTUATOR AND METHOD

(75) Inventors: Jennifer Farrell, Vancouver, WA (US); Orhan E. Beckman, Camas, WA (US); Robin Walton, Culver City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1939 days.

(21) Appl. No.: 10/721,703

(22) Filed: Nov. 25, 2003

(65) Prior Publication Data

US 2005/0111022 A1    May 26, 2005

(51) Int. Cl.
*G06F 15/00* (2006.01)
*G06F 3/12* (2006.01)
(52) U.S. Cl. .................... 358/1.13; 358/1.15
(58) Field of Classification Search ........... 358/1.1, 358/1.9, 1.13, 1.15, 1.18, 402, 400, 474, 358/448
See application file for complete search history.

(56) References Cited

U.S. PATENT DOCUMENTS

| 4,875,061 | A  | * | 10/1989 | Kobayakawa | ............... | 347/116 |
|---|---|---|---|---|---|---|
| 5,971,582 | A  | * | 10/1999 | Fuji | ............................. | 700/90 |
| 6,456,403 | B1 |   | 9/2002  | Archer et al. |  |  |
| 6,467,896 | B2 |   | 10/2002 | Meyer et al. |  |  |
| 6,496,182 | B1 |   | 12/2002 | Wong et al. |  |  |
| 6,542,176 | B1 |   | 4/2003  | Camis |  |  |
| 6,549,734 | B2 |   | 4/2003  | Yamada et al. |  |  |
| 6,636,711 | B1 | * | 10/2003 | Katahira | ...................... | 399/82 |
| 6,701,011 | B1 | * | 3/2004  | Nakajima | ................... | 382/167 |
| 6,788,907 | B1 | * | 9/2004  | Burkes et al. | ................. | 399/82 |

* cited by examiner

*Primary Examiner*—Gabriel I Garcia

(57) ABSTRACT

Various embodiments of an image forming device, programs and methods are provided. In one representative embodiment an image forming device receives a document for printing and prints at least a portion of the document monochromatically or in color. Whether the portion of the document is printed monochromatically or in color is based upon the print mode setting associated with the document and the state of the print mode actuator of the image forming device.

10 Claims, 3 Drawing Sheets

IMAGE FORMING DEVICE WITH PRINT MODE ACTUATOR AND METHOD

BACKGROUND

Many image forming devices, such as printers, can produce print media having color print or black print or both. In many situations, a client computer that sends documents to the printer for printing allows a user to specify the print mode or configuration in which a printer is to print such documents. However, in some situations it may be undesirable to allow users to print in one print mode or the other. For example, owners of a local area network may not wish users on the network to print documents in color unless necessary to reduce the cost of printing documents in color. In other situations, where a user is given the flexibility of selecting the print configuration, it may be undesirable to specify the print mode at the client computer. Setting the proper configuration at the client computer can be cumbersome to many users because it involves navigation through steps in an unfamiliar software application such as a print driver. This can be time consuming and expensive in situations where a change in print mode between sets of copies, for example, is desired and where print media having the wrong print is produced due to a failure to properly specify the print mode for various documents.

BRIEF DESCRIPTION OF THE SEVERAL VIEWS OF THE DRAWINGS

The example embodiments of the present invention can be understood with reference to the following drawings. The components in the drawings are not necessarily to scale. Also, in the drawings, like reference numerals designate corresponding parts throughout the several views.

DETAILED DESCRIPTION

Figure 1:
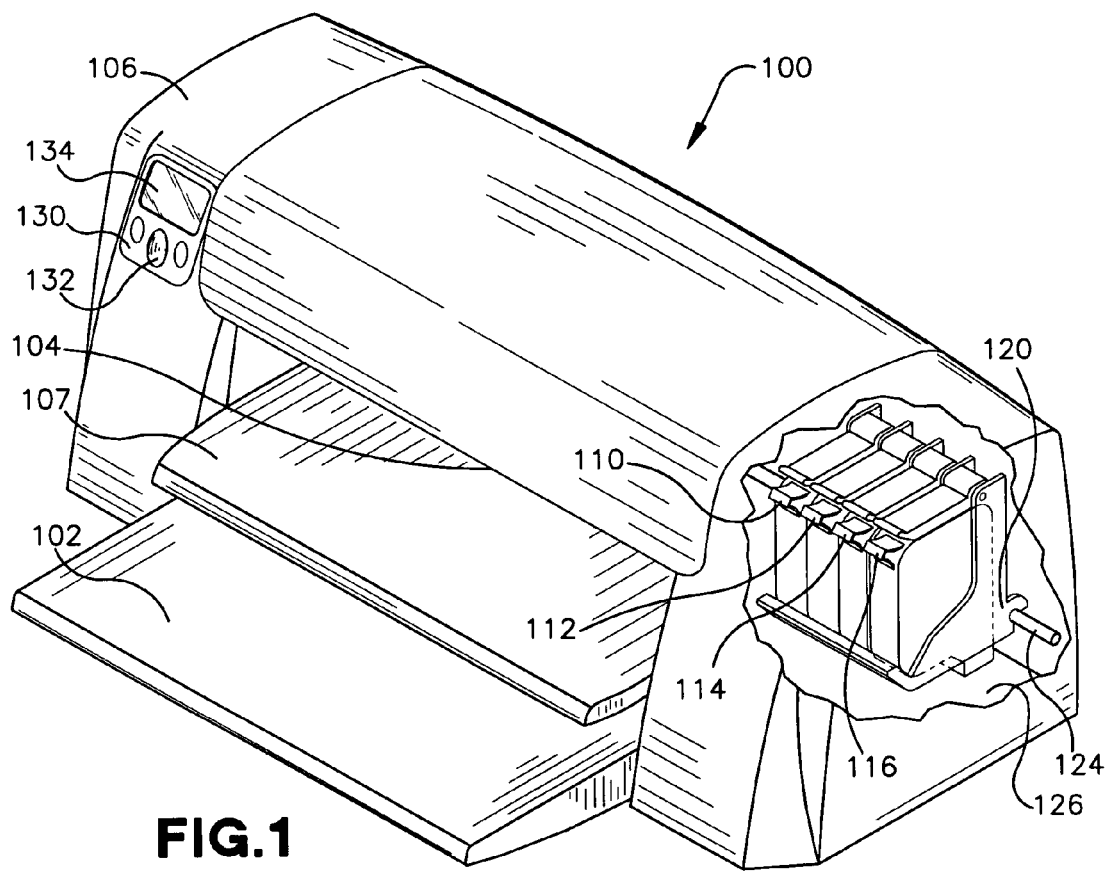
FIG. 1 is a perspective view of an example of an image forming device according to an embodiment of the invention.

FIG. 1 illustrates image forming device 100 according to an exemplary embodiment of the present invention. Image forming device 100 includes an input tray 102 for loading print media (not shown), which includes but is not limited to, for example, plain paper, bond paper, and photographic paper. In operating the image forming device 100, items of print media are fed into the image forming device 100 through feed tray 102. The print media is moved through the print zone 104, typically by motor-driven rollers (not shown) inside the enclosure 106. After an image is printed on the print media, the print media exits the enclosure 106 onto output tray 107 or its equivalent.

While the following description of example embodiments of an image forming device 100 pertain to printers, it should be understood that the present invention pertains to image forming devices in general, such as copiers, fax machines, and other devices, as well as combinations thereof. Also, the principles of the present invention are applicable to different types of image forming devices 100 including, but not limited to, inkjet printers, laser printers, multifunction peripherals, for example, in a variety of configurations.

The image forming device 100 contains at least two types of marking agents, such as, for example, black, cyan, magenta, yellow, and other color marking agents. A marking agent is any substance that can be used to produce an image on the print media 103, for example, ink, toner and other substances capable of reproducing an image. Image forming device 100 is, for example, an ink jet printer that may contain four ink cartridges 110, 112, 114 and 116. For example, ink cartridge 110 may contain black ink (B) and ink cartridges 112, 114, and 116 and may contain three different color inks, such as, cyan (C), magenta (M) and yellow (Y), however additional ink cartridges may also be used. Alternatively, in another embodiment, if the image forming device 100 is a laser printer, the image forming device 100 may contain at least two toner cartridges (not shown) each of which may contain toner of various colors including black and and other colors. For example, a laser printer may include 1 black toner cartridge and at least 3 color toner cartridges. The inks in each of the ink cartridges 110, 112, 114, and 116 can be, for example, pigment based inks, dye based inks, and combinations thereof. The ink cartridges can be arranged in one of several sequences along carriage assembly 120 as is known by one of ordinary skill in the art.

As illustrated in this example embodiment, inside the enclosure 106, a guide rod 124 is mounted to chassis 126 to support the carriage assembly 120 which travels in two directions along a single axis, along the print zone 104. A motor (not shown) driven by a controller (not shown) propels the carriage assembly 120 along a guide rod 126. The ink cartridges 110, 112, 114, 116 travel back and forth along the guide rod 126 shooting drops of ink onto the print media 103 as it moves through the print zone 104.

According to an embodiment of the present invention, the image forming device 100 includes an operator panel 130 for operating a variety of equipment functions. Within the operator panel 130 is a print mode actuator 132 which allows a user to override a print setting associated with a document as will be described. The print mode actuator 132 can be any user-accessible mechanical, electrical, or electrical-mechanical device, for example, a push button or a toggle switch, or a button presented in a touch screen, etc. In one embodiment, the print mode actuator 132 may be placed in any one of two states, namely, an application state and a monochromatic override state, although it is possible that there may be more than two states. The operator panel 130 can also include a display 134 that may indicate the state of the print mode actuator 132 as well as other functions of the image forming device 100.

As contemplated herein, the term "monochromatic" used in describing the printing of documents refers to printing in a single color. The term "color" used herein to describe the printing of documents refers to printing in multiple colors. Any color marking agent may be employed to print a monochromatic version of a document, however, usually such a color is black.

The image forming device 100 may also include an indicator light such as, for example, a light emitting diode that indicates the current state of the print mode actuator 132 to a user. Specifically, the indicator light may be illuminated when the print mode actuator 132 is in the monochromatic override state. Alternatively, the indicator light may be illuminated when the print mode actuator 132 is in the application state. When the print mode actuator 132 is placed in the monochromatic override state, the printer prints monochromatically, thereby overriding any color print setting associated with a document by an application such as, for example, a word processing application or a print driver executed on a client computer (not shown) in communication with the image forming device 100. When the print mode actuator 132 is in the application state, the printer prints documents monochromatically or in color according to the print mode settings associated with the document by an appropriate application as will be described.

In addition, a "document" as described herein may be embodied in digital form (i.e. a digital file) or hard copy form (i.e. on appropriate print media). In this respect, an application executed in a client computer is employed, for example, to generate a document in digital form that is sent to the image forming device 100 to be printed onto appropriate print media. During the print process, a user may manipulate, for example, an application such as a print driver to associate a desired print mode setting with a document to be printed. To associate the print mode setting with the document, the print mode setting may be included in a header, for example, that is associated with the document before it is sent to the image forming device 100 for printing. The print mode setting specifies whether the document is to be printed monochromatically or in color. The header may also include other information that guides the operation of the image forming device 100 in printing the document.

The print mode actuator 132 may be actuated or toggled, thereby changing its state while the image forming device 100 is currently printing a document (i.e. on the fly) or during an idle period when the image forming device 100 is between documents. If the print mode actuator 132 is toggled on the fly, it may be necessary to perform a transition from color printing to monochromatic printing or vice versa at an appropriate transition point during the printing of the document. The specific timing of any transition point that may occur between monochromatic and color printing for a specific document can vary. For example, the transition point may be one of a several different predefined points during the printing of a document, or the transition may be postponed until after a document is completed. The concept of providing a transition point to execute a change in printing from monochromatic to color or color to monochromatic on the fly will be described in further detail below.

Figure 2:
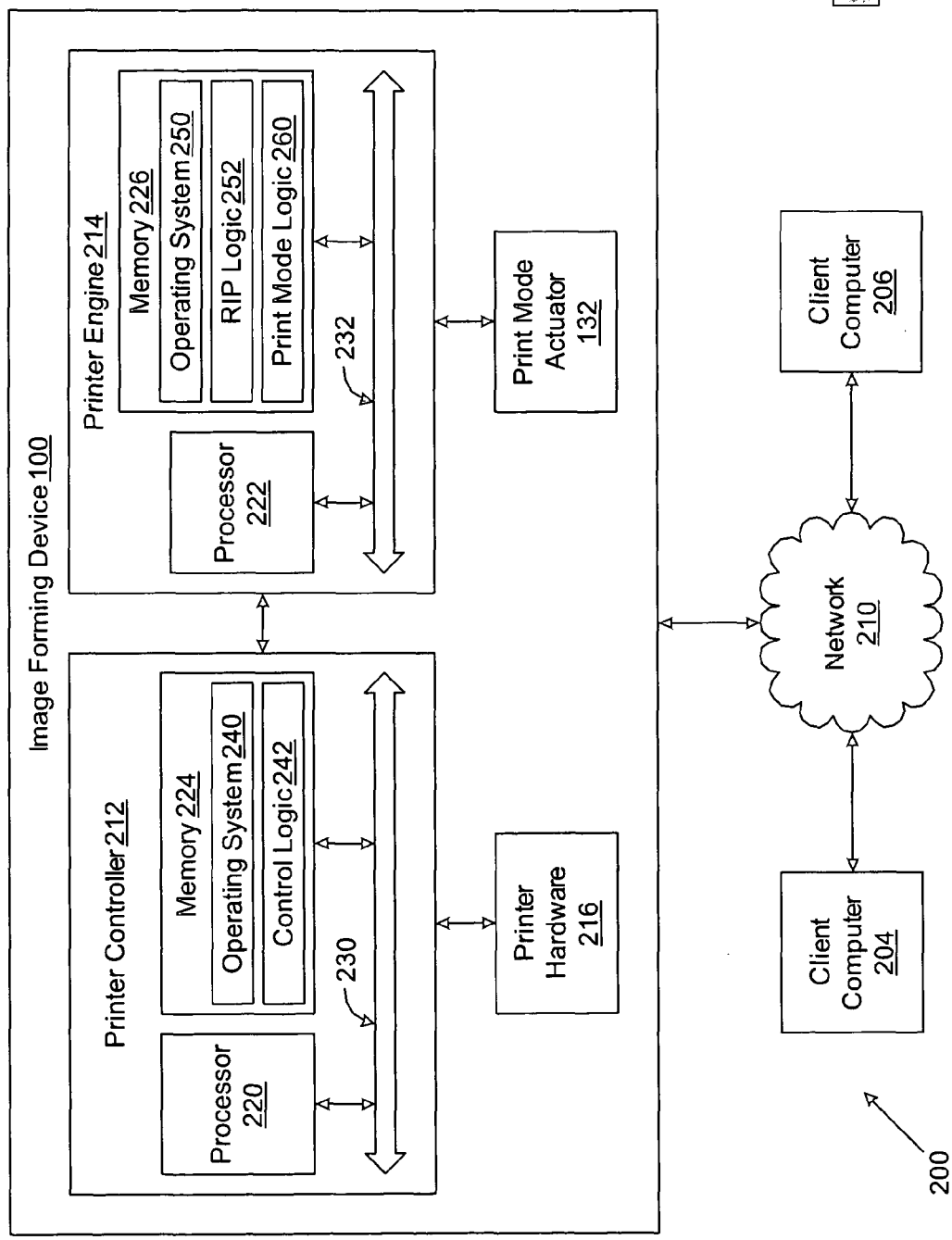
FIG. 2 is a block diagram of an example of a network that includes the image forming device of FIG. 1 according to an embodiment of the invention.

FIG. 2 is a block diagram that illustrates an example embodiment of client print network 200 that includes the image forming device 100 of FIG. 1, and client computers 204, 206, all of which can be coupled to a network 210. The example embodiment of FIG. 2 is described with reference to a client computer that interfaces with the image forming device 100 in a networked environment, however, in an alternative embodiment the client computers 204, 206 could be directly coupled to the image forming device without use of the network 210.

The network 210 may include, for example, the Internet, intranets, wide area networks (WANs), local area networks, wireless networks, or other suitable networks, etc., or any combination of two or more such networks. In addition, servers, or computers other than computers 204, 206, or other devices may be coupled to the network 210. The computer systems 204, 206 may be, for example, desktops, laptops, palm or hand held computers such as a personal digital assistant, or any other devices with like capability.

The image forming device 100 includes a printer controller 212 and a printer engine 214. The printer controller 212 controls the various functions and printer hardware 216 such as motors, paper path moving equipment, and the like that actually facilitate the printing of a document. The printer engine 214 attends to preprint functions such as raster image processing (RIP) of documents into raster data that is provided to the printer controller 212 to drive the printing of the documents. Generally, raster image processing involves the process by which a document expressed, for example, in a page description language such as, for example, Printer Control Language (PCL) that describes a document to be printed, is converted into pixel or raster data that drives printer components for printing. In this respect, raster image processing (RIP) may be performed to generate pixel or raster data that represents a document in a single color (monochromatic), or in multiple colors (in color). A raster image processing of a document that generates pixel or raster data that produces images from a single color (a monochromatic image) on a document is defined herein as a "monochromatic RIP". Similarly a raster image processing of a document that generates pixel or raster data that produces images from multiple colors of marking agent on a document is defined herein as a "color RIP". The concept of raster image processing (RIP) is well known in the art and, consequently, is not discussed in detail herein.

The printer controller 212 and the printer engine 214 communicate with one another. The printer engine 214 also interfaces with the print mode actuator 132 as will be described. The printer controller 212 and the printer engine 214 each include a processor circuit having a processor 220, 222 and a memory 224, 226, each of which is coupled to respective local interfaces 230, 232. Each of the local interfaces 230, 232 may be, for example, a data bus with an accompanying control/address bus, as can be appreciated by those of ordinary skill in the art.

The printer controller 212 also includes software or firmware components that are stored in the memory 224 and are executed by the processors 220. These components include, for example, operating system 240 and printer control logic 242. The printer engine 214 also includes software or firmware components that are stored in the memory 226 and are executable by the processor 222. These components include, for example, operating system 250, raster image processing (RIP) logic 252, and print mode logic 260. The RIP logic 252 may include monochromatic RIP logic that performs raster image processing to generate images of a document using a single marking agent, for example black, and color RIP logic that performs raster image processing to generate a color image using multiple marking agents of different colors. The print mode logic 260 is executed to determine which of the color RIP logic or monochromatic RIP logic is employed to RIP a particular document as will be discussed.

As used herein, the term "executable" means a program file that is in a form that can ultimately be run by the processors 220, 222. Examples of executable programs may be, for example, a compiled program that can be translated into machine code in a format that can be loaded into a random access portion of the memories 224, 226 and run by the processors 220, 222 or source code that may be expressed in proper format such as object code that is capable of being loaded into a random access portion of the memories 224, 226 and executed by the processors 220, 222 etc. An executable program may be stored in any portion or component of the memories 224, 226 including, for example, random access memory, read-only memory, a hard drive, compact disk (CD), floppy disk, or other memory components.

The memories 224, 226 are each defined herein as both volatile and nonvolatile memory and data storage components. Volatile components are those that do not retain data values upon loss of power. Nonvolatile components are those that retain data upon a loss of power. Thus, each of the memories 224, 226 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 220, 222 may represent multiple processors and each of the memories 224, 226 may represent multiple memories that operate in parallel processing circuits, respectively. In such a case, each of the local interfaces 230, 232 may be an appropriate network that facilitates communication between any two of the multiple processors, between any processor and any of the memories, or between any two of the memories, etc. The processors 220, 222 may be of electrical, optical, or molecular construction, or of some other construction as can be appreciated by those with ordinary skill in the art.

The operating systems 240, 250 executed to control the allocation and usage of hardware resources such as the memory, processing time and peripheral devices in the image forming device 100. In this manner, the operating systems 240, 250 serve as the foundation on which applications depend.

Next, a general description of the operation of the image forming device 100 is provided within the context of the client print network 200 of FIG. 2. The printer engine 214 performs raster image processing of a document received in the image forming device 100 for printing from one of the client computers 204, 206 through the network 210. The raster image processed data resulting therefrom is provided to the printer controller 212 to accomplish the printing of the document. A user desiring to print a document may specify that the document be printed monochromatically or in color by manipulating an appropriate application such as a word processor or print driver in a client computer 204, 206. In this respect, a print mode setting is associated with the document that specifies whether the document is to be printed monochromatically or in color. The print mode setting can be associated with the document by an application such as a print driver in a client computer 204, 206 by including appropriate setting information in a header associated with the document to be printed as was described previously.

Upon receiving the document to be printed, the print mode logic 260 in the printer engine 214 determines whether the document is to be printed monochromatically or in color depending upon the state of the print mode actuator 132 and the print mode setting associated with the document.

Once this determination is made, the print mode logic 260 then interfaces with the RIP logic 252 to initiate either a monochromatic RIP or color RIP of the document. After the document is raster image processed, then RIP data is provided to the printer controller 212 that controls the printer hardware 216 to accomplish the monochromatic or color printing of the document. Thus, the print mode logic 260 directs which of the color RIP logic or monochromatic RIP logic are executed to RIP the particular document based upon the print mode setting associated with the document and the state of the print mode actuator 132.

To explain the operation of the RIP logic 252 in greater detail, when initiated by processor 222, the RIP logic 252 performs raster operations to render a document or image for printing. More specifically, RIP logic 252 converts the document as expressed, for example, in a Printer Control Language or other appropriate language into pixel data or raster image data for printing. The print mode logic 260 directs the RIP logic 252 to RIP a particular document in color according to color RIP logic or monochromatically according to monochromatic RIP logic. The RIP logic 252 determines a color separation for each pixel of the document to be printed. Thus, for a given pixel, the corresponding color separation may indicate a specific amount of each color marking agent such as cyan (C), magenta (M), and yellow (Y) inks of ink cartridges 110, 112, 114, 116 (FIG. 1) or CMYK toner described above that is/are to be deposited onto the print medium to form the pixel itself that is part of a printed image. Whether raster image processing monochromatically or in color, the RIP logic 252 performs RIP operations on a strip by strip basis as is typical in the art.

The print mode logic 260 directs whether a document is raster image processed and printed monochromatically or in color based upon the state of the print mode actuator 132 and the print mode setting associated with the document. Specifically, if the print mode actuator 132 is in the "application" state, as detected by the print mode logic 260, then when a document is received to be printed, the print mode logic 260 examines the print mode setting associated with the document itself. If the print mode setting specifies that the document is to be printed in color, then the print mode actuator 132 executes the color RIP logic to perform a color RIP of the document for color printing. On the other hand, if the print mode setting specifies that the document is to be printed monochromatically, then the print mode actuator 132 executes the monochromatic RIP logic to perform a monochromatic RIP of the document(s) for monochromatic printing. Thus, when the print mode actuator 132 is in the application state, the document is printed monochromatically or in color based upon the print mode setting associated with the document by an appropriate application. Hence the name "application state".

Alternatively, if the print mode actuator 132 is in the monochromatic override state when a document is received in the image forming device 100 to be printed, then the print mode logic 260 executes the monochromatic RIP logic to perform a monochromatic RIP of the document for monochromatic printing. In this situation, the print mode setting associated with the document is ignored by the print mode logic, even if the print mode setting specifies that the document is to be printed in color. In this sense, the setting of the print mode actuator 132 overrides the print mode setting associated with the document. Hence the name "override state".

Thus, if the print mode setting associated with the document specifies monochromatic printing, then the document is raster image processed and printed monochromatically regardless of the state of the print mode actuator 132.

In alternative embodiments, the print mode actuator 132 (FIG. 1) of image forming device 100 is configured to prevent inadvertent change in its state. For example, if the print mode actuator 132 is inadvertently activated, for example, by being physically bumped, then the state of the print mode logic 260 may change contrary to the wishes of a user. To prevent such an occurrence, the print mode actuator 132 may be configured to change state only after at least two manipulations. This may be, for example, pressing the print mode actuator, for example, a push button twice, etc. Alternatively, one may be required to press or otherwise manipulate the print mode actuator 132 and hold it in an "actuated" state for a predefined period of time before a change in the state of the print mode actuator 132 occurs. In still another alternative, a query may be generated on the display 134 (FIG. 1) after the print mode actuator 132 is manipulated that requires a user to confirm that the change in the state of the print mode actuator 132 is to be made. The user can then activate the print mode actuator 132 a second time to confirm the request for a change in the state of the print mode actuator 132, etc.

Figure 3:
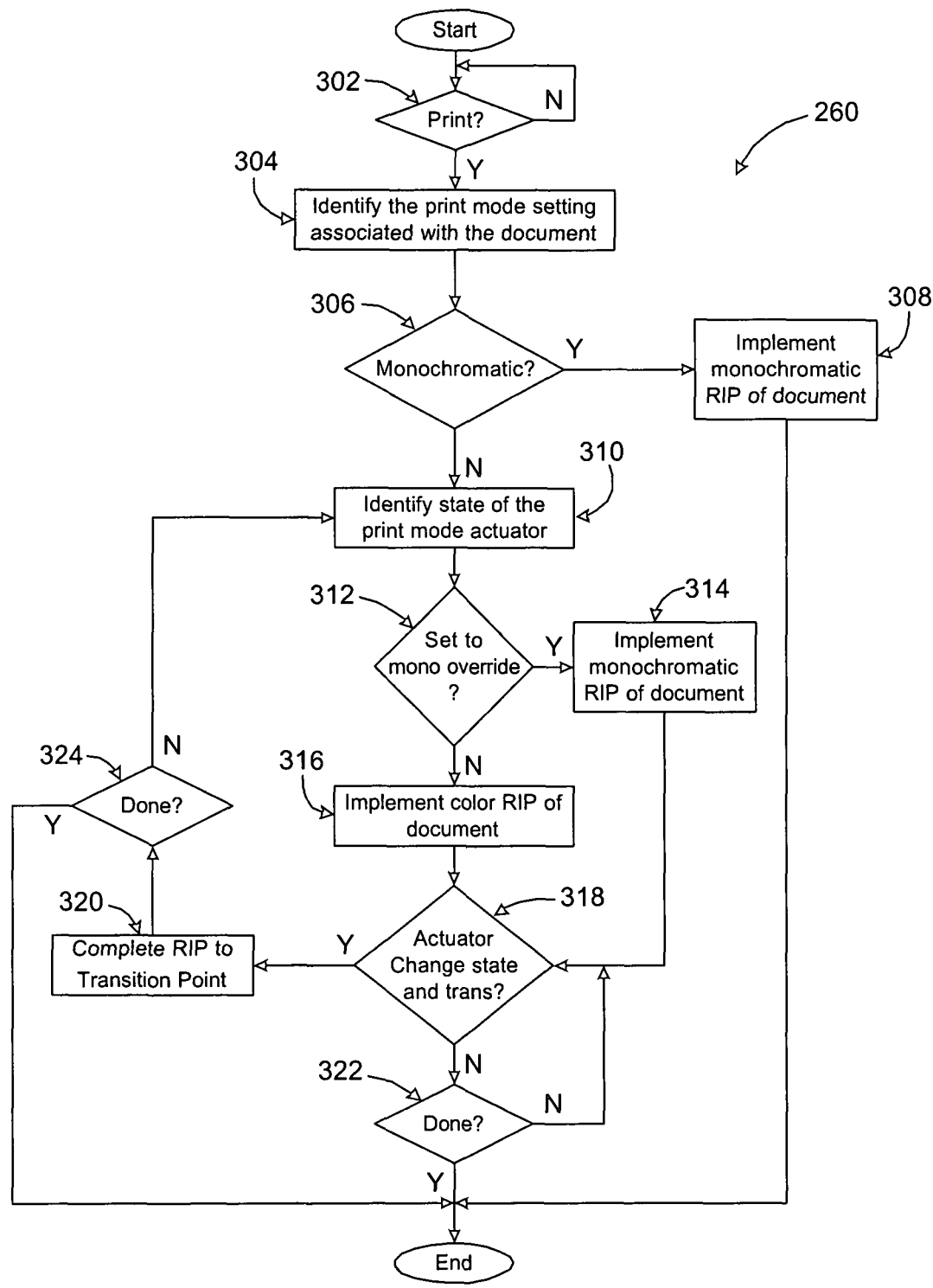
FIG. 3 is a flow chart that provides an example of the print mode logic that is executed in a printer in the network of FIG. 2 according to an embodiment of the invention.

FIG. 3 shows a flow chart of one example of the print mode logic 260 according to another embodiment of the present invention. Alternatively, FIG. 3 may be viewed as depicting steps of an example of a method implemented in an image forming device 100 to determine whether to print a document monochromatically or in color. The functionality of the print mode logic 260 as depicted by the example flow chart of FIG. 3 may be implemented, for example, in an object oriented design or in some other suitable programming architecture. Assuming the functionality is implemented in an object oriented design, each block represents functionality that may be implemented in one or more methods that are encapsulated in one or more objects. The print mode logic 260 may be implemented using any one of a number of programming languages such as, for example, C, C++, or other suitable programming languages.

Beginning with box 302, the print mode logic 260 waits until a document is received from a client 204, 206 (FIG. 2) to be printed. Assuming that a document has been so received, then at box 304 the print mode logic 260 identifies the print mode setting associated with the document itself. The print mode setting may specify monochromatic printing or color printing as determined by the application such as a print driver or word processor executed on a client 204, 206. Next, in box 306, the print mode logic 260 determines whether the print mode setting associated with the document specifies monochromatic printing. If so, then the print mode logic 260 proceeds to box 308. Otherwise, the print mode logic 260 moves to box 310.

In box 308, the print mode logic 260 implements the execution of a monochromatic RIP of the document by causing the RIP logic 252 to perform a monochromatic RIP of the document. Thereafter, the print mode logic 260 ends as shown. The print mode logic 260 ends at this point as there will be no transition from a monochromatic RIP to a color RIP as the monochromatic printing of the document will not change in response to a change in the state of the print mode actuator 132.

Assuming that the print mode logic 260 has proceeded to box 310, then the print mode logic 260 determines the state of the print mode actuator 132. Thereafter, in box 312, if print mode logic 260 has determined that the print mode actuator 132 is in the monochromatic override state, then the print mode logic 260 proceeds to box 314. Otherwise, the print mode logic 260 progresses to box 316. In box 314, the print mode logic 260 executes a monochromatic RIP of the document by causing the RIP logic 252 to RIP the document monochromatically. Thereafter, the print mode logic 260 proceeds to box 318.

In box 316, since it was determined that the print mode actuator 132 is in the application state in box 312, then the print mode logic 260 implements the execution of a color RIP of the document by causing the RIP logic 252 to RIP the document in color. This is because the print mode setting associated with the document indicates that the document is to be printed in color and the print mode actuator 132 is in the application state. Thereafter, the print mode logic 260 proceeds to box 318.

In box 318, while the document is undergoing monochromatic or color raster image processing, the print mode logic 260 determines whether there has been a change in the state of the print mode actuator 132 requiring a transition between a color and a monochromatic RIP of the document. Specifically, if the print mode actuator 260 is originally in the monochromatic override state in box 312, then even though the print mode setting of the document specifies color printing, a monochromatic RIP is performed and a monochromatic document is printed. If the state of the print mode actuator 132 is changed to the application state during the monochromatic RIP of this document, then a transition should be made to a color RIP of the document.

Similarly, if the print mode actuator 260 is originally in the application state in box 312 and the print mode setting associated with the document specifies printing in color, then a color RIP is implemented in box 316 and the document is printed in color. If the state of the print mode actuator 132 is changed to the monochromatic override state during the color RIP of the document, then a transition should be made from the color RIP to the monochromatic RIP.

Assuming that the state of the print mode actuator 132 has changed in box 318, then the print mode logic 260 proceeds to box 320. Otherwise, the print mode logic 260 proceeds to box 322.

In box 320, the print mode logic 260 completes the current raster image processing of the document up to an appropriate transition point. The transition point is a location in the Raster image processing of a document at which the transition from a color RIP to a monochromatic RIP or vice versa is made. That is, at the transition point, the print mode logic 260 will change the raster image processing that is performed on the document from monochromatic to color or from color to monochromatic, or between other predefined print modes, etc. The transition point can be set at one of several possible points during the printing of a document in the image forming device 100. For example, the transition may take place between strips of the document that are raster image processed by the RIP logic 252. In this respect, the transition occurs upon completion of the raster image processing of a strip of the document that was in progress at the time of the change in the state of the print mode actuator. Alternatively, the transition point may take place between pages of a particular document such that the transition occurs upon completion of a raster image processing of a page of the document that was in progress at the time of the change in the state of the print mode actuator. In still another alternative, the transition point may take place between objects that are raster image processed according to a display list, etc., such that the transition occurs upon completion of a raster image processing of an object that makes up part of an image on the document that was in progress at the time of the change in the state of the print mode actuator.

In another alternative, the transition point may be specified to be the end of the document, thereby avoiding a transition during the printing of the document altogether. In such case, the monochromatic or color RIP of an entire document is completed even though the change in the state of the print mode actuator 132 that occurred results in an inconsistency between the state of the print mode actuator 132 and the raster image processing of the document that was in progress at the time of the change in the state of the print mode actuator.

After the document has been raster image processed up to the transition point in box 320, then the print mode logic 260 proceeds to box 324 in which it is determined whether the raster image processing (and therefore the printing) of the document is complete. This may be the case, for example, if the transition was to occur after the raster image processing of the last strip, the last page, or the last object of the document. Alternatively, this would be the case if the transition is set to occur at the end of the document itself. If the raster image processing of the document is determined to be complete in box 324, then the print mode logic 260 ends as shown. Otherwise, the print mode logic 260 reverts back to box 310 in which the new state of the print mode actuator 132 is determined and raster image processing of the document is reestablished as described above.

Assuming that the print mode logic 260 determines that there was no change in the state of the print mode actuator 132 in box 318, then in box 322 the print mode logic 260 determines if the printing of the document is complete. If not, then the print mode logic 260 reverts back to box 318 and the print mode logic 260 determines once again whether a change in the print mode actuator 132 has occurred as discussed above. On the other hand, if it is determined that the printing of the document is complete in box 320, then the print mode logic 260 ends as shown. In this manner, once the raster image processing of a document commences, the print mode logic 260 continually checks to see if a change in the state of the print mode actuator 132 has occurred until the printing of the document is complete.

Thus, in this embodiment of the present invention, the print mode logic 260 is configured such that when the print mode actuator 132 is in the application state it will implement raster image processing monochromatically or in color as specified by the print mode settings associated with the document. When the print mode actuator 132 is in the monochromatic override state, it overrides a color print mode setting associated with a document and performs a monochromatic RIP and printing of the document.

Although the print mode logic 260 (FIGS. 2-3) and the RIP logic 252 (FIG. 2) are embodied in software or code executed by general purpose hardware as discussed above, as an alternative each may also be embodied in dedicated hardware or a combination of software/general purpose hardware and dedicated hardware. If embodied in dedicated hardware, the print mode logic 260 and the RIP logic 252 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram of FIG. 2 and/or the flow chart of FIG. 3 show the architecture, functionality, and operation of an implementation of the print mode logic 260 and the RIP logic 252 among other aspects of the present invention. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 3 shows a specific order of execution, it is understood that the order of execution may differ from that which is depicted. For example, the order of execution of two or more blocks may be changed relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the print mode logic 260 and/or the RIP logic 252 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the print mode logic 260 and/or the RIP logic 252 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method, comprising:
   receiving a document for printing in an image forming device, wherein a print mode setting is associated with the document;
   printing at least a portion of the document monochromatically or in color based upon the print mode setting and a state of a print mode actuator in the image forming device, where the print mode actuator includes at least an application state and a monochromatic override state;
   implementing an execution of a raster image processing of the document, wherein the raster image processing is of one of a monochromatic raster image processing or a color raster image processing;
   detecting a change in the state of the print mode actuator during the execution of the raster image processing of the document; and
   transitioning the raster image processing of the document at a transition point in response to the change in the state of the print mode actuator.

2. The method of claim 1, wherein the transitioning is upon completion of the monochromatic or color raster image processing of a strip of the document that was in progress at the time of the change in the state of the print mode actuator.

3. The method of claim 1, wherein the transitioning is upon completion of the monochromatic or color raster image processing of a page of the document that was in progress at the time of the change in the state of the print mode actuator.

4. A method, comprising:
 receiving a document for printing in an image forming device, wherein a print mode setting is associated with the document;
 printing at least a portion of the document monochromatically or in color based upon the print mode setting and a state of a print mode actuator in the image forming device, where the print mode actuator includes at least an application state and a monochromatic override state;
 executing one of a monochromatic raster image processing or a color raster image processing of the document;
 detecting a change in the state of the print mode actuator during the execution of the one of the monochromatic raster image processing or the color raster image processing of the document; and
 completing the monochromatic raster image processing or the color raster image processing of the document even though a change in the state of the print mode actuator is detected that results in an inconsistency between the state of the print mode actuator and the raster image processing of the document that was in progress at the time of the change in the state of the print mode actuator.

5. A program embodied in a computer readable medium, comprising:
 code that identifies a print mode setting associated with a document received for printing in an image forming device;
 code that implements a printing of at least a portion of the document monochromatically or in color based upon the print mode setting and a state of a print mode actuator in the image forming device, where the print mode actuator includes at least an application state and a monochromatic override state;
 code that implements an execution of a raster image processing of the document, wherein
 the raster image processing is one of a monochromatic raster image processing or a color raster image processing;
 code that detects a change in the state of the print mode actuator during the execution of the raster image processing of the document; and
 code that transitions the raster image processing of the document at a transition point in response to the change in the state of the print mode actuator.

6. The program embodied in the computer readable medium of claim 5, wherein the code that transitions further comprises code that implements the transition upon completion of the monochromatic or color raster image processing of a strip of the document that was in progress at the time of the change in the state of the print mode actuator.

7. The program embodied in the computer readable medium of claim 5, wherein the code that transitions further comprises code that implements the transition upon completion of the monochromatic or color raster image processing of a page of the document that was in progress at the time of the change in the state of the print mode actuator.

8. An image forming device, comprising:
 a print mode actuator disposed on the image forming device having a first state and a second state, where the first state is an application state and the second state is a monochromatic override state; and
 a print engine configured to implement a printing of at least a portion of a document monochromatically or in color based upon a print mode setting associated with the document and based upon a state of the print mode actuator in the image forming,
 the print engine is further configured to detect a change in the state of the print mode actuator during an execution of a raster image processing of the document, wherein the raster image processing is one of a monochromatic raster image processing or a color raster image processing,
 the print engine is further configured to implement a transition of the raster image processing of the document at a transition point in response to the change in the state of the print mode actuator.

9. The image forming device of claim 8, wherein the print engine is further configured to implement the transition upon completion of the monochromatic or color raster image processing of a strip of the document that was in progress at the time of the change in the state of the print mode actuator.

10. The image forming device of claim 8, wherein the print engine is further configured to implement the transition upon completion of the monochromatic or color raster image processing of a page of the document that was in progress at the time of the change in the state of the print mode actuator.

\* \* \* \* \*

UNITED STATES PATENT AND TRADEMARK OFFICE
CERTIFICATE OF CORRECTION

PATENT NO. : 7,719,700 B2 Page 1 of 1
APPLICATION NO. : 10/721703
DATED : May 18, 2010
INVENTOR(S) : Jennifer Farrell et al.

It is certified that error appears in the above-identified patent and that said Letters Patent is hereby corrected as shown below:

In column 11, lines 40-43, in Claim 5,
delete "code that implements an execution of a raster image
processing of the document, wherein
the raster image processing is one of a monochromatic raster
image processing or a color raster image processing;"
and insert
-- code that implements an execution of a raster image
processing of the document, wherein the raster image processing
is one of a monochromatic raster image processing
or a color raster image processing; --, therefor.

Signed and Sealed this

Thirty-first Day of August, 2010

David J. Kappos
*Director of the United States Patent and Trademark Office*